US010225389B2

(12) United States Patent
Lindberg et al.

(10) Patent No.: US 10,225,389 B2
(45) Date of Patent: Mar. 5, 2019

(54) COMMUNICATION CHANNEL INDICATORS

(75) Inventors: Phillip John Lindberg, Helsinki (FI);
Sami Johannes Niemela, Helsinki (FI)

(73) Assignee: NOKIA TECHNOLOGIES OY, Espoo (FI)

(*) Notice: Subject to any disclaimer, the term of this patent is extended or adjusted under 35 U.S.C. 154(b) by 748 days.

(21) Appl. No.: 11/770,906

(22) Filed: Jun. 29, 2007

(65) Prior Publication Data
US 2009/0007016 A1  Jan. 1, 2009

(51) Int. Cl.
| H04M 1/725 | (2006.01) |
| G06F 3/0481 | (2013.01) |
| H04M 1/2745 | (2006.01) |
| H04M 3/42 | (2006.01) |

(52) U.S. Cl.
CPC .... *H04M 1/72522* (2013.01); *G06F 3/04817* (2013.01); *H04M 1/72583* (2013.01); *H04M 1/27455* (2013.01); *H04M 1/274583* (2013.01); *H04M 1/72544* (2013.01); *H04M 3/42374* (2013.01); *H04M 2201/42* (2013.01); *H04M 2207/18* (2013.01); *H04M 2250/22* (2013.01)

(58) Field of Classification Search
CPC ......... H04M 1/72522; H04M 1/72583; H04M 1/27455; H04M 1/274583; H04M 3/42374; H04M 29/06088; G06F 3/04817; G05B 2219/36143; G05B 2219/31474
USPC ................................ 715/835, 859, 771, 736
See application file for complete search history.

(56) References Cited

U.S. PATENT DOCUMENTS

| 5,386,360 | A | * | 1/1995 | Wilson et al. | ................... 700/17 |
| 5,400,246 | A | * | 3/1995 | Wilson et al. | ................... 700/17 |
| 5,615,325 | A | * | 3/1997 | Peden | ............................ 715/854 |
| 5,745,717 | A | * | 4/1998 | Vayda et al. | ................... 715/834 |
| 5,790,820 | A | * | 8/1998 | Vayda et al. | ................... 715/834 |
| 5,793,365 | A | * | 8/1998 | Tang | ....................... G06Q 10/10 715/758 |
| 5,798,760 | A | * | 8/1998 | Vayda et al. | ................... 715/834 |
| 5,841,654 | A | * | 11/1998 | Verissimo et al. | .............. 700/83 |

(Continued)

FOREIGN PATENT DOCUMENTS

| CA | 2 455 256 A1 | * | 1/2004 | ............. H04L 29/06 |
| CN | 101030117 A | * | 9/2007 | ............. G06F 3/048 |

(Continued)

OTHER PUBLICATIONS

Bing search q=connected%20disconnected%20%20comm Apr. 3, 2016.*

(Continued)

*Primary Examiner* — Jeffrey A Gaffin
*Assistant Examiner* — John M Heffington
(74) *Attorney, Agent, or Firm* — Alston & Bird LLP

(57) ABSTRACT

A method includes providing at least one entity icon on a screen of a device, providing at least one visual indicator corresponding to a communication channel associated with the at least one entity, where the visual indicator that corresponds to an active communication channel is different from the visual indicator that corresponds to an inactive communication channel, opening a entity application by selecting an entity icon, moving the entity icon and releasing the entity icon, and opening a communication link with the selected entity by selecting the visual indicator corresponding to an active communication channel.

18 Claims, 8 Drawing Sheets

(56) References Cited

U.S. PATENT DOCUMENTS

| | | | | |
|---|---|---|---|---|
| 5,923,327 | A * | 7/1999 | Smith | G06F 3/0481 715/784 |
| 6,084,951 | A * | 7/2000 | Smith | H04M 1/274516 379/93.17 |
| 6,095,674 | A * | 8/2000 | Verissimo et al. | 700/83 |
| 6,141,003 | A * | 10/2000 | Chor et al. | 715/719 |
| 6,144,378 | A * | 11/2000 | Lee | G06F 3/0236 715/767 |
| 6,157,645 | A * | 12/2000 | Shobatake | 370/395.41 |
| 6,219,053 | B1 * | 4/2001 | Tachibana et al. | 715/835 |
| 6,226,367 | B1 * | 5/2001 | Smith | H04M 1/576 379/142.04 |
| 6,442,263 | B1 * | 8/2002 | Beaton | H04M 1/274516 379/142.04 |
| 6,448,987 | B1 * | 9/2002 | Easty et al. | 715/834 |
| 6,544,123 | B1 * | 4/2003 | Tanaka et al. | 463/36 |
| 6,718,185 | B1 * | 4/2004 | Hisatomi | H04M 1/72522 455/554.1 |
| 6,738,809 | B1 * | 5/2004 | Brisebois | H04L 41/22 345/172 |
| 6,807,558 | B1 * | 10/2004 | Hassett et al. | 709/203 |
| 6,983,227 | B1 * | 1/2006 | Thalhammer-Reyero | 703/2 |
| 6,987,847 | B1 * | 1/2006 | Murphy | H04L 12/581 379/201.1 |
| 7,086,011 | B2 * | 8/2006 | Budrys | G06F 3/04817 715/762 |
| 7,129,818 | B1 * | 10/2006 | Begole | G08B 21/0469 340/286.02 |
| 7,143,356 | B1 * | 11/2006 | Shafrir | G06Q 10/10 709/201 |
| 7,583,676 | B2 * | 9/2009 | Shobatake | 370/395.1 |
| 7,599,362 | B2 * | 10/2009 | Sandell | H04M 1/274558 370/328 |
| 8,300,098 | B1 * | 10/2012 | Gruttadauria et al. | 348/143 |
| 8,368,640 | B2 * | 2/2013 | Dardinski et al. | 345/108 |
| 8,711,102 | B2 * | 4/2014 | Kong | G06F 3/04817 345/173 |
| 9,026,177 | B2 * | 5/2015 | Edwards | H04W 48/08 455/418 |
| 2002/0060750 | A1 * | 5/2002 | Istvan et al. | 348/569 |
| 2002/0089541 | A1 * | 7/2002 | Orbanes et al. | 345/764 |
| 2002/0091762 | A1 * | 7/2002 | Sohn et al. | 709/203 |
| 2002/0091977 | A1 * | 7/2002 | Mastro et al. | 714/712 |
| 2003/0020762 | A1 * | 1/2003 | Budrys | G06F 3/04817 715/835 |
| 2004/0039779 | A1 * | 2/2004 | Amstrong et al. | 709/204 |
| 2004/0098449 | A1 * | 5/2004 | Bar-Lavi et al. | 709/202 |
| 2005/0027802 | A1 * | 2/2005 | Madsen et al. | 709/204 |
| 2005/0034081 | A1 * | 2/2005 | Yamamoto et al. | 715/810 |
| 2005/0044509 | A1 * | 2/2005 | Hunleth et al. | 715/834 |
| 2005/0058094 | A1 * | 3/2005 | Lazaridis | H04L 51/04 370/328 |
| 2005/0143968 | A9 | 6/2005 | Odom et al. | 703/21 |
| 2005/0144271 | A1 * | 6/2005 | Shirane et al. | 709/223 |
| 2005/0193376 | A1 * | 9/2005 | Harrison | 717/127 |
| 2005/0213577 | A1 * | 9/2005 | Shobatake | 370/395.1 |
| 2005/0232167 | A1 * | 10/2005 | Gilbert et al. | 370/260 |
| 2006/0048062 | A1 * | 3/2006 | Adamson | 715/760 |
| 2006/0066729 | A1 * | 3/2006 | Renkis | 348/211.2 |
| 2006/0229557 | A1 * | 10/2006 | Fathallah et al. | 604/101 |
| 2006/0242584 | A1 * | 10/2006 | Johanson et al. | 715/738 |
| 2006/0253593 | A1 * | 11/2006 | Jachner | H04M 3/42195 709/227 |
| 2007/0016958 | A1 * | 1/2007 | Bodepudi et al. | 726/27 |
| 2007/0035513 | A1 * | 2/2007 | Sherrard et al. | 345/157 |
| 2007/0088818 | A1 * | 4/2007 | Roberts | H04L 63/102 709/224 |
| 2007/0094620 | A1 * | 4/2007 | Park | 715/862 |
| 2007/0101291 | A1 * | 5/2007 | Forstall et al. | 715/805 |
| 2007/0101297 | A1 * | 5/2007 | Forstall et al. | 715/841 |
| 2007/0129817 | A1 * | 6/2007 | Cadiz et al. | 700/17 |
| 2007/0130541 | A1 * | 6/2007 | Louch et al. | 715/804 |
| 2007/0133437 | A1 * | 6/2007 | Wengrovitz et al. | 370/260 |
| 2007/0150544 | A1 * | 6/2007 | Jachner | 709/207 |
| 2007/0180392 | A1 * | 8/2007 | Russo | 715/765 |
| 2007/0199032 | A1 * | 8/2007 | Renkis | 725/105 |
| 2007/0238522 | A1 * | 10/2007 | Chandranmenon | A63F 13/12 463/40 |
| 2007/0240189 | A1 * | 10/2007 | Paila | H04L 67/16 725/62 |
| 2007/0274460 | A1 * | 11/2007 | Shaffer et al. | 379/37 |
| 2008/0005263 | A1 * | 1/2008 | Baraev | H04L 29/12122 709/217 |
| 2008/0034314 | A1 * | 2/2008 | Louch et al. | 715/778 |
| 2008/0052742 | A1 * | 2/2008 | Kopf et al. | 725/34 |
| 2008/0057960 | A1 * | 3/2008 | Lahtiranta | H04M 1/72583 455/435.2 |
| 2008/0111822 | A1 * | 5/2008 | Horowitz et al. | 345/530 |
| 2008/0139116 | A1 * | 6/2008 | Balgard | G08C 17/02 455/41.2 |
| 2008/0141153 | A1 * | 6/2008 | Samson et al. | 715/769 |
| 2008/0147639 | A1 * | 6/2008 | Hartman | G06F 3/0482 |
| 2008/0216022 | A1 * | 9/2008 | Lorch et al. | 715/847 |
| 2008/0222569 | A1 * | 9/2008 | Champion et al. | 715/834 |
| 2008/0270977 | A1 * | 10/2008 | Nucci et al. | 717/105 |
| 2008/0282164 | A1 * | 11/2008 | Blass | G06F 17/30861 715/719 |
| 2009/0083665 | A1 * | 3/2009 | Anttila et al. | 715/834 |
| 2009/0097406 | A1 * | 4/2009 | Nilakantan et al. | 370/235 |
| 2009/0228824 | A1 * | 9/2009 | Forstall et al. | 715/779 |
| 2010/0005425 | A1 * | 1/2010 | Kodosky et al. | 715/853 |
| 2010/0011311 | A1 * | 1/2010 | Kodosky et al. | 715/771 |
| 2010/0017470 | A1 * | 1/2010 | Hyoung | H04L 12/581 709/204 |
| 2010/0058188 | A1 * | 3/2010 | Shah et al. | 715/734 |

FOREIGN PATENT DOCUMENTS

| | | | | |
|---|---|---|---|---|
| EP | | 1 439 674 A2 * | 7/2004 | H04L 12/58 |
| JP | | 2004-208217 A | 7/2004 | |
| WO | WO | 2006/107143 A1 | 10/2006 | |
| WO | WO | 2007/008321 A2 | 1/2007 | |
| WO | WO | 2007/060147 A1 | 5/2007 | |

OTHER PUBLICATIONS

Bing search q=active+inactive+communication+chan Apr. 3, 2016.*
11770906_Apr. 3, 2016_CN_101030117_A_I.*
Korean Office Action for Application No. 10-2010-7002019; dated Oct. 26, 2012.
Skype User Guide 3, v. 2.6, Mar. 23, 2007, pp. 1-29.
USB Cordless Dual Phone—User Manual, Nov. 2005, pp. 1-29.
Office Action for Japanese Application No. 2010-514166 dated Jul. 25, 2011.
Office Action for Korean Application No. 10-2010-7002019 dated Aug. 20, 2011.
International Search Report and Written Opinion for Application No. PCT/IB2008/001663 dated Jan. 19, 2009.
Office Action for Chinese Application No. 20080022840.0; dated Feb. 6, 2013.
Office Action for Chinese Application No. 200880022840.0 dated May 3, 2012.
Office Action for European Application No. 08 776 290.2 dated Nov. 22, 2013.
Communication from corresponding European Patent Application No. 08776290.2 dated Jun. 16, 2016.
Office Action for European Application No. 08 776 290.2 dated Feb. 9, 2017.
Office Action for European Application No. 08 776 290.2 dated Nov. 13, 2017, 4 pages.
Office Action for Indian Application No. 257/CHENP/2010 dated May 12, 2015.
Office Action for European Application No. 08 776 290.2 dated Oct. 11, 2011.

* cited by examiner

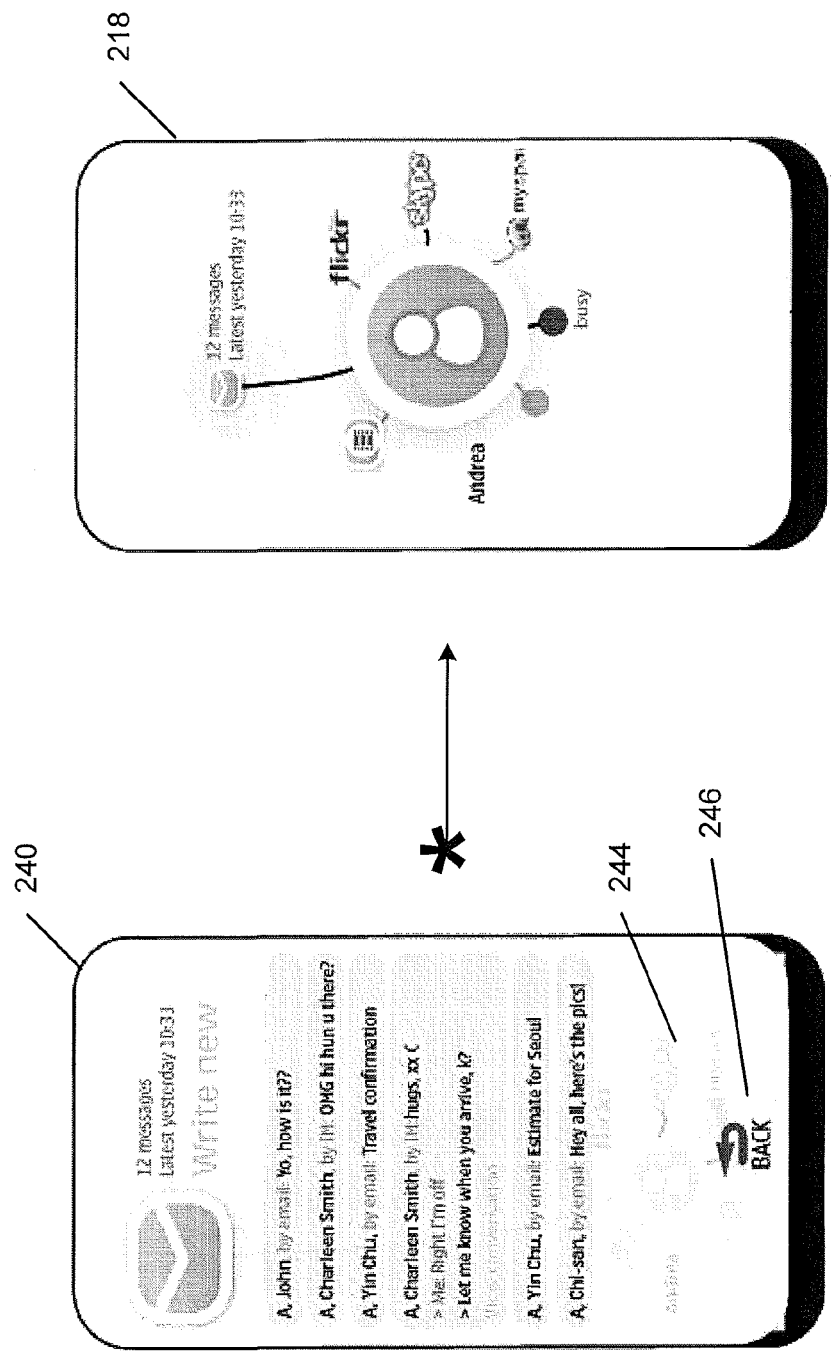

COMMUNICATION CHANNEL INDICATORS

BACKGROUND

1. Field

The disclosed embodiments generally relate to user interfaces and in particular to identifying active communication channels on a user interface.

2. Brief Description of Related Developments

Mobile devices, such as mobile communication devices, generally include a variety of applications, including for example Internet communications, instant messaging capabilities, email facilities, web browsing and searching. In these mobile devices, it is usually necessary to open and activate an active communication application signal status that informs others of their availability on a channel. It would be advantageous to have a quick view as to entities that are available to be communicated with and the manner in which the communication with the entity can occur, as well as being able to easily open and establish a communication channel.

SUMMARY

In one aspect, the disclosed embodiments are directed to a method. In one embodiment the method includes providing at least one contact entity icon on a screen of a device, providing at least one visual indicator associated with the at least one contact entity corresponding to a communication channel associated with the at least one contact entity, where the visual indicator that corresponds to an active communication channel is different from the visual indicator that corresponds to an inactive communication channel, opening an entity application by selecting an entity icon, moving the entity icon and releasing the entity icon, and opening a communication link with the selected entity by selecting the visual indicator corresponding to an active communication channel.

In another aspect, the disclosed embodiments are directed to a user interface. In one embodiment, the user interface includes at least one entity icon on a screen of a device; at least one visual indicator associated with the at least one entity icon, the at least one visual indicator corresponding to a communication channel associated with the at least one entity icon, wherein a visual indicator for an active communication channel is different than a visual indicator for an inactive communication channel; and a selection link associated with each visual indicator, the activation of which will couple the entity to the communication channel.

In a further aspect the disclosed embodiments are directed to an apparatus. In one embodiment the apparatus includes a controller; a display interface coupled to the controller; an input device coupled to the controller; and a processor coupled to the controller. In one embodiment the processor is configured to provide at least one entity icon on a screen of a device; provide, for each entity icon, at least one visual indicator corresponding to an active communication channel and at least one visual indicator corresponding to an inactive communication channel, wherein the visual indicators for active communication channels and inactive communication channels are distinct from one another; and open a communication link to an entity associated with the selected entity icon over a communication channel, when a visual indicator corresponding to an active communication channel is selected.

In yet another aspect, the disclosed embodiments are directed to a system. In one embodiment, the system includes means for providing at least one entity icon on a screen of a device; means for providing, for each entity icon, at least one visual indicator corresponding to an active communication channel and at least one visual indicator corresponding to an inactive communication channel, wherein the visual indicators for active communication channels and inactive communication channels are distinct from one another; and means for opening a communication link to an entity associated with the selected entity icon over a communication channel, when a visual indicator corresponding to an active communication channel is selected.

In yet a further aspect, the disclosed embodiments are directed to a computer program product. In one embodiment, the computer program product stored in a memory includes a computer useable medium having computer readable code means embodied therein for causing a computer to open a communication channel with an entity. In one embodiment, the computer readable code means in the computer program product includes computer readable program code means for causing a computer to provide at least one entity icon on a display of a device; computer readable program code means for causing a computer to provide at least one visual indicator corresponding to at least one communication channel associated with the entity icon; computer readable program code means for causing a computer to apply different visual indicators to active communication channels and non-active communication channels; and computer readable program code means for causing a computer to open a communication channel to an entity associated with the entity icon when a visual indicator corresponding to an active communication channel is selected.

BRIEF DESCRIPTION OF THE DRAWINGS

The foregoing aspects and other features of the embodiments are explained in the following description, taken in connection with the accompanying drawings, wherein:

FIGS. 2A-2E are illustrations of exemplary screen shots of the user interface of the disclosed embodiments.

DETAILED DESCRIPTION OF THE EMBODIMENT(S)

Figure 1:
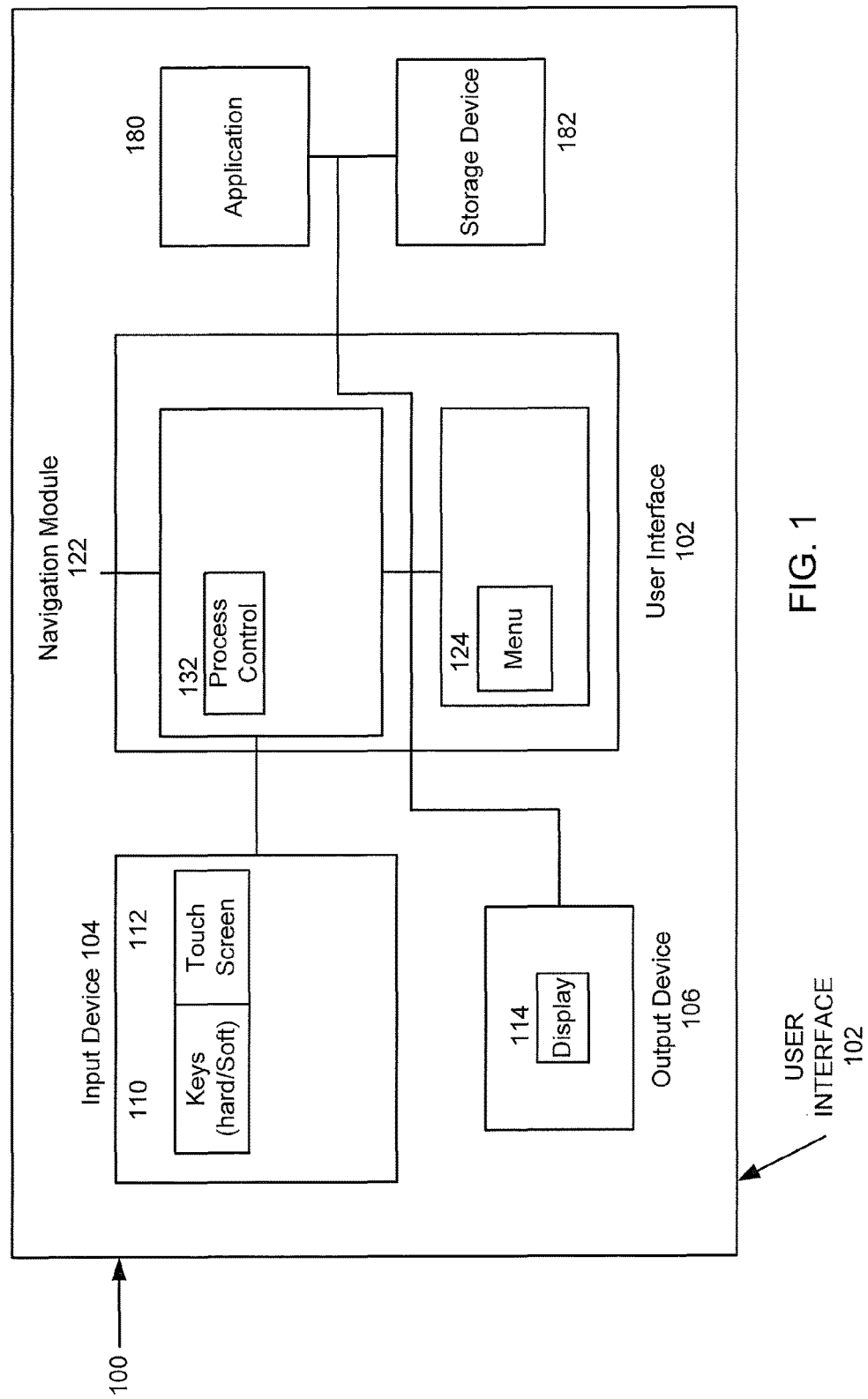
FIG. 1 shows a block diagram of a system in which aspects of the disclosed embodiments may be applied.

Referring to FIG. 1, one embodiment of a system 100 is illustrated that can be used to practice aspects of the claimed invention. Although aspects of the claimed invention will be described with reference to the embodiments shown in the drawings and described below, it should be understood that these aspects could be embodied in many alternate forms of embodiments. In addition, any suitable size, shape or type of elements or materials could be used.

The disclosed embodiments generally allow a user of a device or system, such as the system 100 shown in FIG. 1, to easily identify communication contacts or entities and channels which can be used to establish a communications link. The disclosed embodiments provide for quick channel selection for initiating communications as well as monitoring and presence detection. Entities are displayed as icons, or any suitable graphical image or textual representation, and each entity has one or more visual indicators associated therewith. One type of visual indicator can be indicative of an active communication channel while another type of visual indicator can be indicative of a non-active communication channel. For example, with reference to FIG. 2C, the visual indicators can comprise links or arms 221 and 223. In one embodiment, an extended link, such as link 223 can represent an active communication channel, while a retracted link, such as link 221 can represent an inactive communication channel. In alternate embodiments, a suitable visual indicator can be used to differentiate between active and non-active communication channels. In one embodiment, an entity can be selected and a communication link established. Entities can be viewed in various levels of detail, including their channels, activity and presence.

In one embodiment, referring to FIG. 1, the system 100 of FIG. 1 can include an input device 104, output device 106, navigation module 122, applications area 180 and storage/memory device 182. The components described herein are merely exemplary and are not intended to encompass all components that can be included in a system 100. For example, in one embodiment, the system 100 comprises a mobile communication device or other such internet and application enabled devices. Thus, in alternate embodiments, the system 100 can include other suitable devices and applications for monitoring application content and activity levels in such a device. While the input device 104 and output device 106 are shown as separate devices, in one embodiment, the input device 104 and output device 106 can be part of, and form, the user interface 102. The user interface 102 can be used to display application and element information to the user, and allow the user to obtain application content and application activity data. In one embodiment, the user interface of the disclosed embodiments can be implemented on or in a device that includes a touch screen display. In alternate embodiments, the aspects of the user interface disclosed herein can be embodied on any suitable device that will display information and allow the selection and activation of applications.

Figure 2C:
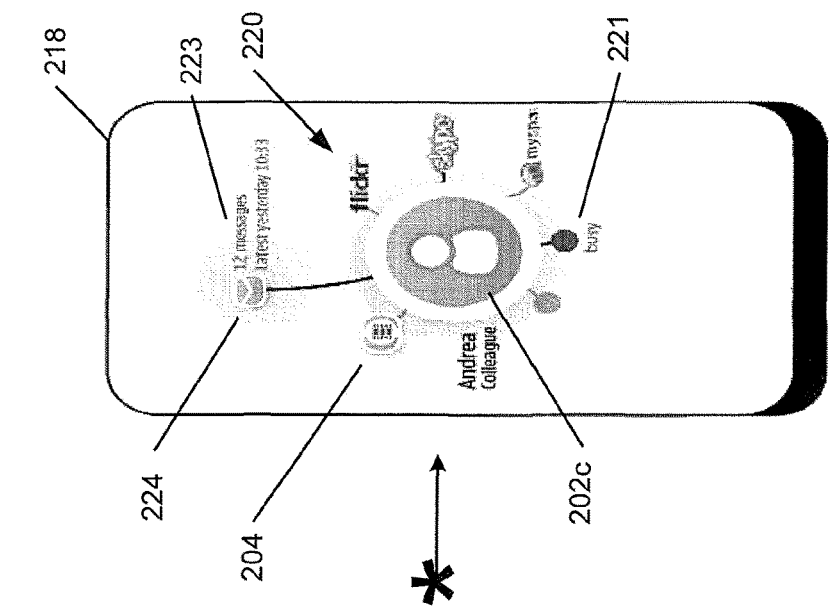
Figure 2B:
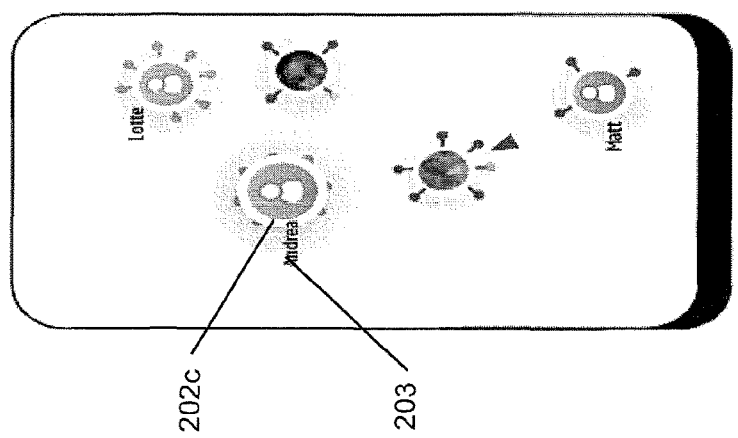
Figure 2A:
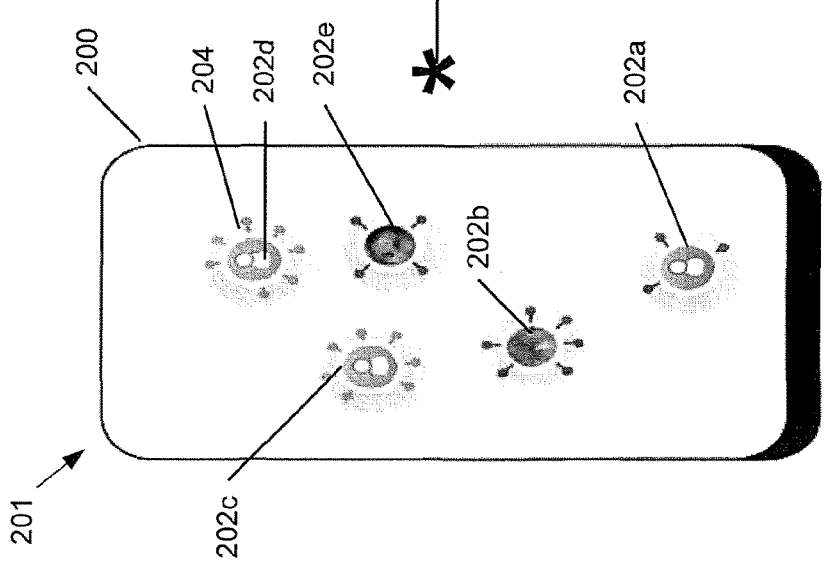

FIG. 2A illustrates one embodiment of a screen shot of a user interface 201 incorporating features of the disclosed embodiments. The screen 200 of FIG. 2A illustrates one or more entity icons or objects 202a-202e (generally referred to as 202) on the screen 200 of a display of a device. In one embodiment, the entity icons 202a-202e, also referred to as pods, can be configured to appear floating on the screen. The entity icons 202 can also include a textual identifier 203, such as "Andrea" (FIG. 2B) associated with the contact icon 202c. In alternate embodiments, any suitable graphical or textual indicator can be used, or not used, to identify an entity icon 202. For example, entity icon 202e has an image or picture of the contact associated with it. In that case, a textual identifier may not be necessary or desired.

In one embodiment, the pods 202 can rotate or move about the screen 200 area of the display. The rotation speeds can be the same or vary amongst the different pods 202. In one embodiment, rotation speeds of the pods 202 can vary based upon a general level of activity of each pod relative to the other pods. Thus, a faster moving or rotating pod may indicate that there is currently a higher level of ongoing activity with the associated contact or contact application as compared to a slower moving pod 202. In alternate embodiments, any suitable mechanism can be used to illustrate activity level, other than including speed. For example, color might be used to indicate levels of activity. Bright or strong colors might be representative of greater activity than dull or dim colors. Opacity might also be used where a higher level of activity is represented by a less opaque image and low activity is represented by more opaqueness. In another embodiment, the pods might flash to represent the relative activity level. Various combinations can be applied as well.

Although the pods 202 may move and rotate, in one embodiment, the textual identifier 203 will generally remain in a relatively fixed horizontal orientation relative to the orientation of the display. The textual identifier 203 will appear to be connected to the entity icon 202 at a pivot point, and follow the movement of the icon from the pivot point. In this fashion, the textual identifier 203 will always be easily viewable by the user, regardless of the speed of rotation or movement of the icon 202.

In one embodiment, referring to FIG. 2A, each entity icon 202 will also include one or more links or arms 204 extending therefrom. These links 204 generally represent a communication channel associated with the particular entity. Examples of communication channels include, but are not limited to email, voip, flicker etc. An extended link can be used represent communication channels that are active. Communication channels that are inactive can have links that are retracted relative to the active communication channel arm icons. In alternate embodiments, any suitable mechanism can be used to differentiate between active communication channels and non-active communication channels, other than including links 204. In one embodiment, the channel links 204 can also included content instances and activity. This might be displayed as additional information or in a pop-up box that appears when a link 204 is highlighted, even temporarily.

Referring to FIG. 2B, to select an entity, a desired entity icon, such as icon 202c is selected. In one embodiment, when the entity is selected, for example by touching, the icon 202c can expand. In alternate embodiments, any suitable highlighting of a selected icon can be used. The entity 202c can be dragged or moved and when the finger or other pointing device is lifted, the entity application associated therewith opens, as shown in FIG. 2C. The terms "select", "move", "drag" "contact" and "touch" are generally described herein with respect to a touch-screen display. However, in alternate embodiments, the terms are intended to encompass the required user action with respect to other input devices. For example, with respect to a proximity screen device, it is not necessary for the user to make direct contact in order to select, move or drag and object or other information. Thus, the above-noted terms are intended to encompass that a user only needs to be within the proximity of the device to carry out the desired function. For example, the term "contact" when used in the context of a proximity screen device, does not imply direct contact, but rather near or close contact, that activates the proximity device.

In FIG. 2C, each link or arm 204 represents and is associated with or a link to a different channel that can be contacted. In the example shown in FIG. 2C, the more active channels, such as link 223, is oriented to appear on the top or upper region 220 of the icon 202c. In alternate embodiments, the communication channel icons 204 can be positioned and oriented in any suitable manner. At the end of each link 204, an indicator or icon 224 can be provided that gives additional information on the communication channel application, such as for example a detailed status. For example, the indicator 224 identifies that there are 12 messages, with the latest message dated yesterday.

Referring to FIG. 2D, when a particular communication channel icon, such as link 223 is selected, the channel opens and the aspects of the channel can be viewed in greater detail. For example, the communication channel related to "messages" is selected an opened. All of the messages will be displayed in detail. The remaining icons from the screen 218 of FIG. 2C can continue to be presented on the display or screen 240, but in a diminished or less conspicuous manner. In the example shown in FIG. 2D, the icons are dimmed or in a watermark format 244. To return from the screen 240 back to the screen 218, an activatable "Back" link 246 is provided. This returns the user to the previous screen, as shown for example in FIG. 2E.

In one embodiment, a graphical representation of each of the channels related to a selected entity, such as entity 202c, could be displayed on the screen 240 of FIG. 2D, for example at the bottom of the screen. The user can select a new channel to access related to the selected entity icon 202c, the details of which would be displayed as described above in the screen shown in FIG. 2D, without having to return to the screen and menu structure shown in FIG. 2C.

Although the examples of FIGS. 2A-2E illustrate the entities as independent of each other, in one embodiment, entity icons 202 can be displayed to show relationships in and among the associated entities. For example, family members can shown to be linked together. User groups, friends and favorites can also be grouped together to show a relationship. Entities and links therebetween could then easily be identified.

Figure 3:
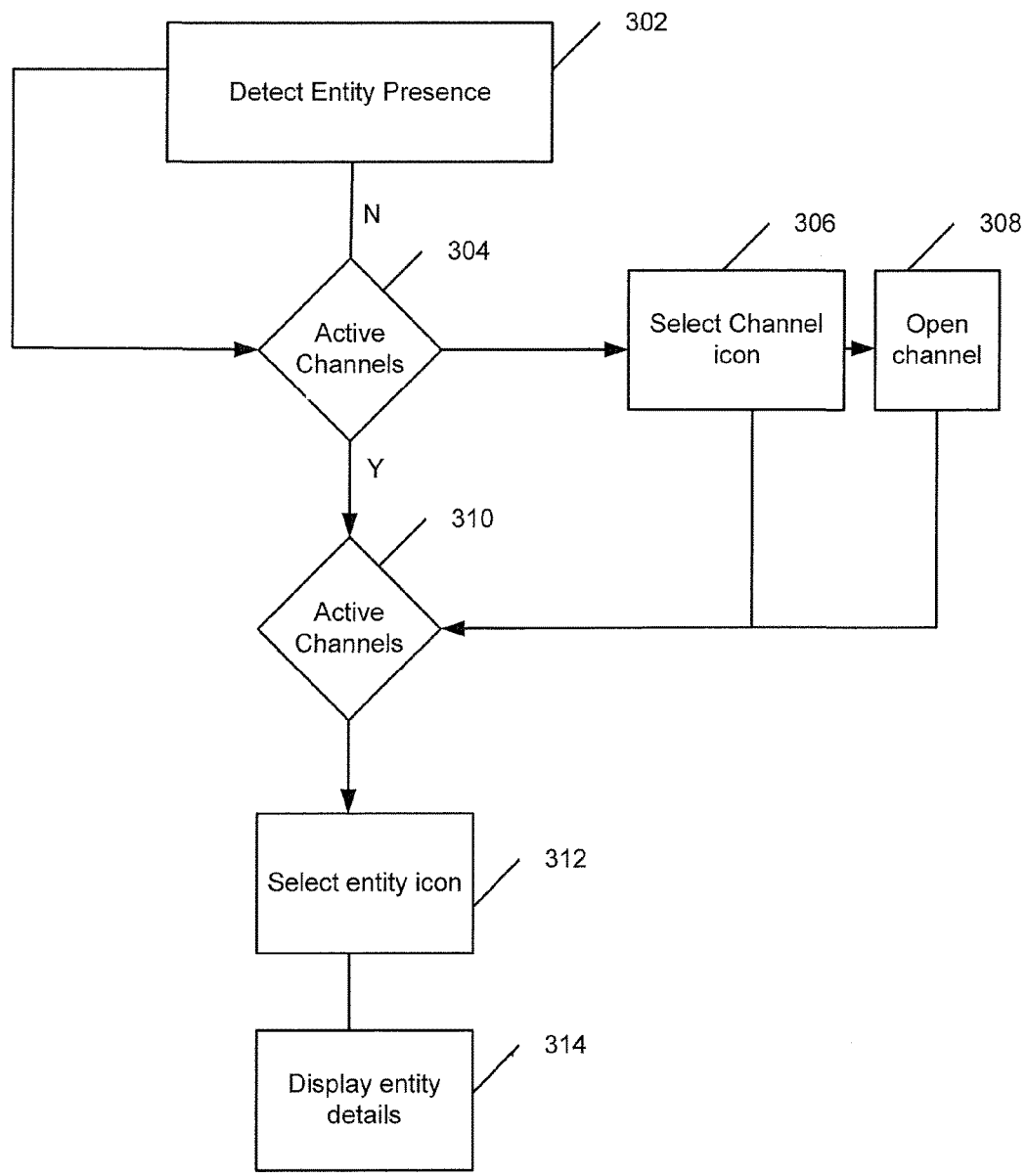
FIG. 3 is an example of a process incorporating features of the disclosed embodiments.

FIG. 3 is an example of a process of obtaining detailed entity information and opening a communication channel with an entity according to the disclosed embodiments. The user determines 302 the presence of one or more entities by observing entity icons displayed on the screen of the device. It is determined 304 whether any active communication channels are present with respect to a desired entity. If yes and the user desires to establish a communication link, the user can select the respective communication link icon 306. This opens 308 the communication channel. If there are no active channels or the user does not desire to open a communication channel, the user can choose 310 to view detailed communication channel active and entity presence information by selecting 312 the entity icon. When the entity icon is selected, detailed information related to the entity, such as communication channel activity and entity presence data can be observed 314 or retrieved.

The aspects of the disclosed embodiments can be implemented on any device that includes a user interface for the display and accessing of information, such as the system 100 shown in FIG. 1. In one embodiment, the input device 104 includes a touch screen display 112 on which the icons 202 and others can be displayed. The inputs and commands from a user, such as the touching of the screen, are received in the input module 104 and passed to the navigation module 122 for processing. The navigation module 122 can determine and set the state of the device. The output device 106, which in one embodiment is implemented in the touch screen display 112, can receive data from the user interface 102, application 180 and storage device 182 for output to the user.

Each of the input device 104 and output device 106 are configured to receive data or signals in any format, configure the data or signals to a format compatible with the application or device 100, and then output the configured data or signals. While a display 114 is shown as part of the output device 106, in other embodiments, the output device 106 could also include other components and device that transmit or present information to a user, including for example audio devices and tactile devices.

The user input device 104 can include controls that allow the user to interact with and input information and commands to the device 100. For example, with respect to the embodiments described herein, the user interface 102 can comprise a touch screen display. The output device 106 can be configured to provide the content of the exemplary screen shots shown herein, which are presented to the user via the functionality of the display 114. Where a touch screen device is used, the displays 112 and 114 can comprise the same or parts of the same display. User inputs to the touch screen display are processed by, for example, the touch screen input control 112 of the input device 104. The input device 104 can also be configured to process new content and communications to the system 100. The navigation module 122 can provide controls and menu selections, and process commands and requests. Application and content objects can be provided by the menu control system 124. The process control system 132 can receive and interpret commands and other inputs, interface with the application module 180, storage device 180 and serve content as required. Thus, the user interface 102 of the embodiments described herein, can include aspects of the input device 104 and output device 106.

Figure 4A:
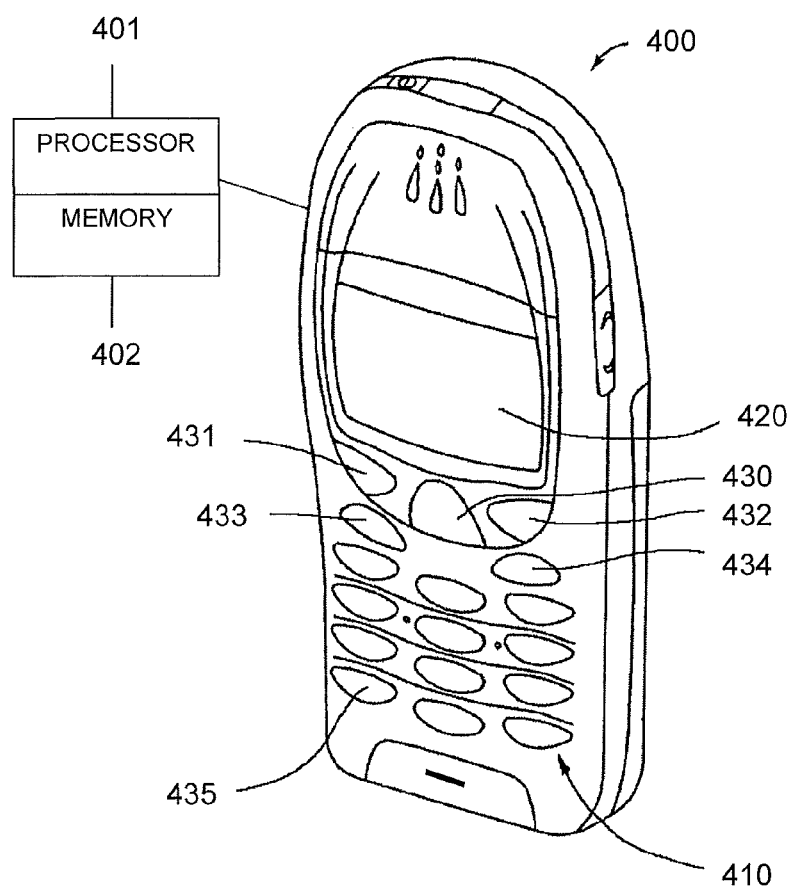
FIGS. 4A-4B are illustrations of examples of devices that can be used to practice aspects of the disclosed embodiments.
Figure 4B:
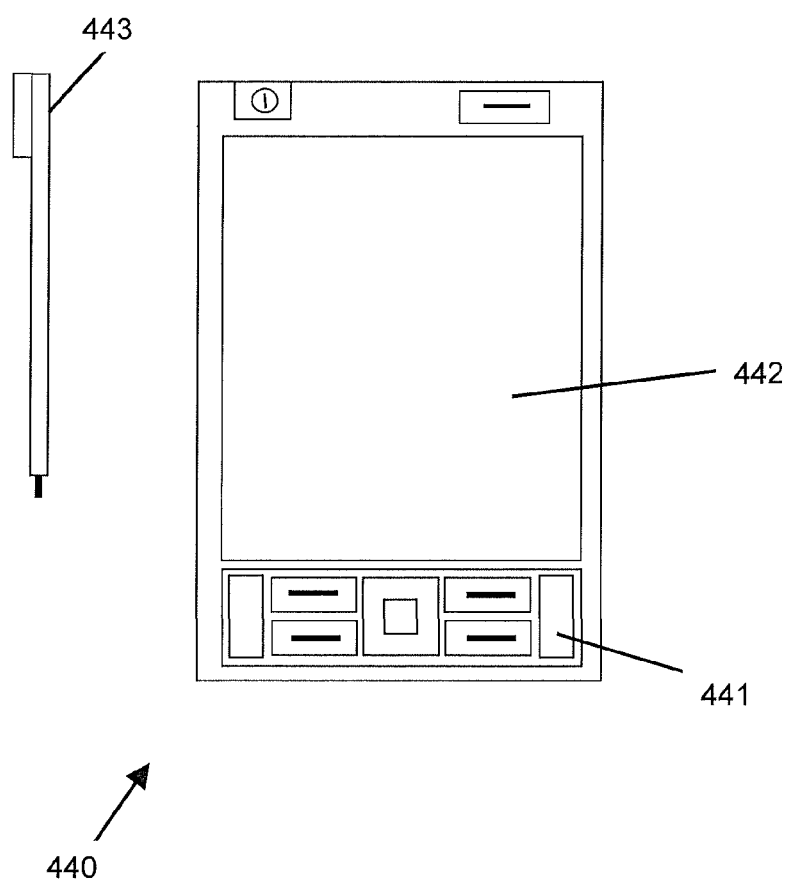

Examples of devices on which aspects of the disclosed embodiments can be practiced are illustrated with respect to FIGS. 4A and 4B. The terminal or mobile communications device 400 may have a keypad 410 and a display 420. The keypad 410 may include any suitable user input devices such as, for example, a multi-function/scroll key 430, soft keys 431, 432, a call key 433, an end call key 434 and alphanumeric keys 435. The display 420 may be any suitable display, such as for example, a touch screen display or graphical user interface. The display may be integral to the device 400 or the display may be a peripheral display connected to the device 400. A pointing device, such as for example, a stylus, pen or simply the user's finger may be used with the display 420. In alternate embodiments any suitable pointing device may be used. In other alternate embodiments, the display may be a conventional display. The device 400 may also include other suitable features such as, for example, a camera, loud speaker, connectivity port or tactile feedback features. The mobile communications device may have a processor 401 connected to the display for processing user inputs and displaying information on the display 420. A memory 402 may be connected to the processor 401 for storing any suitable information and/or applications associated with the mobile communications device 400 such as phone book entries, calendar entries, etc.

Figure 6:
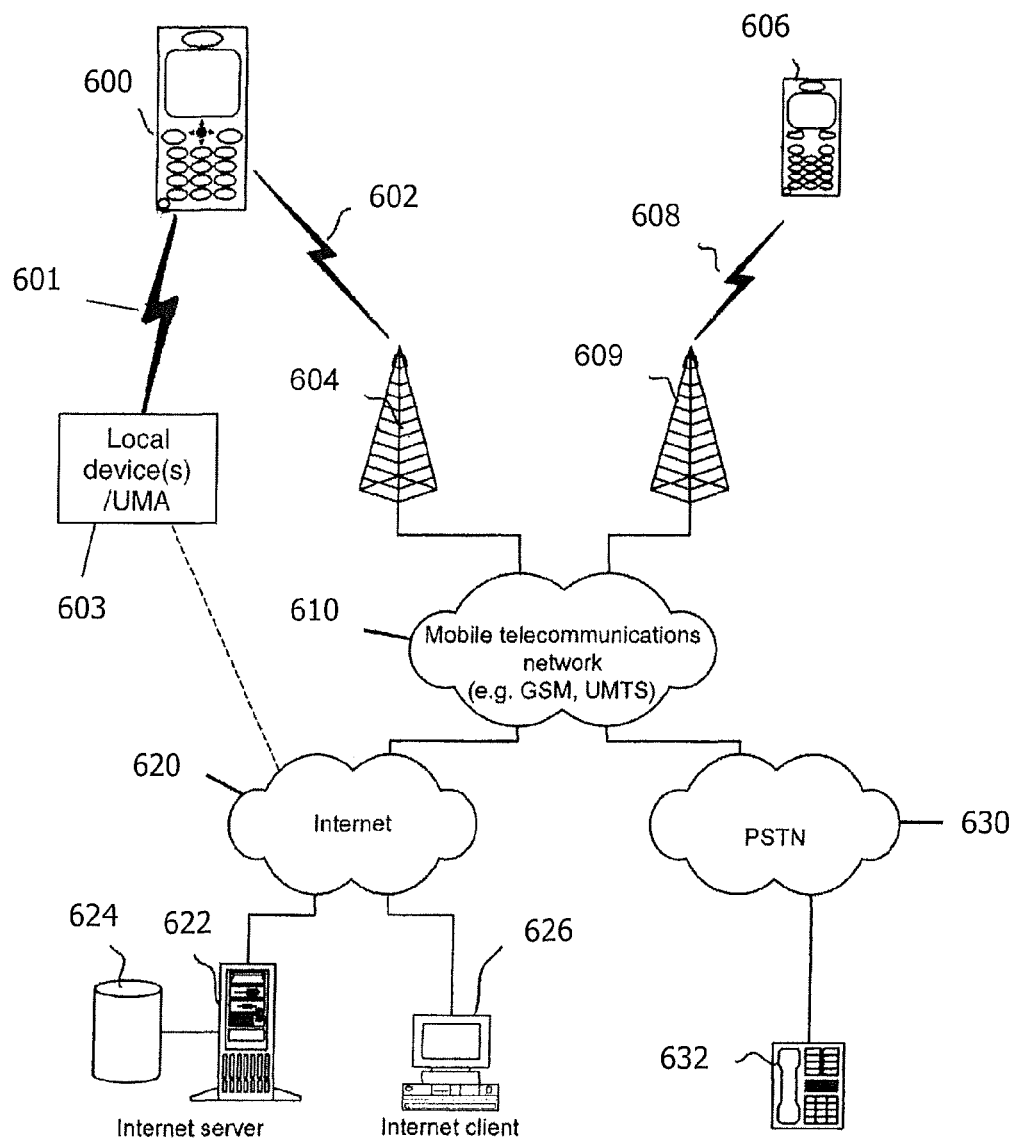
FIG. 6 is a block diagram illustrating the general architecture of the exemplary local system of FIGS. 4A-4B.

In the embodiment where the device 400 comprises a mobile communications device, the device can be adapted for communication in a telecommunication system, such as that shown in FIG. 6. In such a system, various telecommunications services such as cellular voice calls, www/wap browsing, cellular video calls, data calls, facsimile transmissions, music transmissions, still image transmission, video transmissions, electronic message transmissions and electronic commerce may be performed between the mobile terminal 600 and other devices, such as another mobile terminal 606, a line telephone 632, a personal computer 626 or an internet server 622. It is to be noted that for different embodiments of the mobile terminal 600 and in different situations, some of the telecommunications services indicated above may or may not be available. The aspects of the disclosed embodiments are not limited to any particular set of services in this respect.

The mobile terminals 600, 606 may be connected to a mobile telecommunications network 610 through radio frequency (RF) links 602, 608 via base stations 604, 609. The mobile telecommunications network 610 may be in compliance with any commercially available mobile telecommunications standard such as for example GSM, UMTS, D-AMPS, CDMA2000, (W)CDMA, WLAN, FOMA and TD-SCDMA.

The mobile telecommunications network 610 may be operatively connected to a wide area network 620, which may be the internet or a part thereof. An internet server 622 has data storage 624 and is connected to the wide area network 620, as is an internet client computer 626. The server 622 may host a www/wap server capable of serving www/wap content to the mobile terminal 600.

A public switched telephone network (PSTN) 630 may be connected to the mobile telecommunications network 610 in a familiar manner. Various telephone terminals, including the stationary telephone 632, may be connected to the PSTN 630.

The mobile terminal 600 is also capable of communicating locally via a local link 601 to one or more local devices 603. The local links 601 may be any suitable type of link with a limited range, such as for example Bluetooth, a Universal Serial Bus (USB) link, a wireless Universal Serial Bus (WUSB) link, an IEEE 802.11 wireless local area network (WLAN) link, an RS-232 serial link, etc. The local devices 603 can, for example, be various sensors that can communicate measurement values to the mobile terminal 600 over the local link 601. The above examples are not intended to be limiting, and any suitable type of link may be utilized. The local devices 603 may be antennas and supporting equipment forming a WLAN implementing Worldwide Interoperability for Microwave Access (WiMAX, IEEE 802.16), WiFi (IEEE 802.11x) or other communication protocols. The WLAN may be connected to the internet. The mobile terminal 600 may thus have multi-radio capability for connecting wirelessly using mobile communications network 610, WLAN or both. Communication with the mobile telecommunications network 610 may also be implemented using WiFi, WiMax, or any other suitable protocols, and such communication may utilize unlicensed portions of the radio spectrum (e.g. unlicensed mobile access (UMA)). In one embodiment, the navigation module 122 of FIG. 1 can include a communications module that is configured to interact with the system described with respect to FIG. 6.

In one embodiment, the system 100 of FIG. 1 may be for example, a PDA style device 440 illustrated in FIG. 4B. The PDA 440 may have a keypad 441, a touch screen display 442 and a pointing device 443 for use on the touch screen display 442. In still other alternate embodiments, the device may be a personal communicator, a tablet computer, a laptop or desktop computer, a television or television set top box, or any other suitable device capable of containing the display 442 and supported electronics such as a processor and memory. The exemplary embodiments herein will be described with reference to the mobile communications device 400 for exemplary purposes only and it should be understood that the embodiments could be applied equally to any suitable device incorporating a display, processor, memory and supporting software or hardware.

The user interface 102 of FIG. 1 can also include a menu system 124 in the navigation module 122. The navigation module 122 provides for the control of certain states, processes and utilities of the device 100. The menu system 124 can provide for the selection of different tools and application options related to the applications or programs running on the device 100. In the embodiments disclosed herein, the navigation module 122 receives certain inputs, such as for example, signals, transmissions, instructions or commands related to the functions of the device 100. Depending on the inputs, the navigation module interprets the commands and directs the process control 132 to execute the commands accordingly.

Activating a control generally includes any suitable manner of selecting or activating a function associated with the device, including touching, pressing or moving the input device. In one embodiment, where the input device 104 comprises control 110, which in one embodiment can comprise a device having a keypad, pressing a key can activate a function. Alternatively, where the control 110 of input device 104 also includes a multifunction rocker style switch, the switch can be used to select a menu item and/or select or activate a function. When the input device 104 includes control 112, which in one embodiment can comprise a touch screen pad, user contact with the touch screen will provide the necessary input. Voice commands and other touch sensitive input devices can also be used.

Although the above embodiments are described as being implemented on and with a mobile communication device, it will be understood that the disclosed embodiments can be practiced on any suitable device. For example, the device 100 of FIG. 1 can generally comprise any suitable electronic device, such as for example a personal computer, a personal digital assistant (PDA), a mobile terminal, a mobile communication terminal in the form of a cellular/mobile phone, or a multimedia device or computer. In alternate embodiments, the device 100 of FIG. 1 may be a personal communicator, a mobile phone, a tablet computer, a laptop or desktop computer, a television or television set top box a DVD or High Definition player or any other suitable device capable of containing for example a display 114 shown in FIG. 1, and supported electronics such as the processor 401 and memory 402 of FIG. 4A. For description purposes, the embodiments described herein will be with reference to a mobile communications device for exemplary purposes only and it should be understood that the embodiments could be applied equally to any suitable device incorporating a display, processor, memory and supporting software or hardware.

Referring to FIG. 1, the display 114 of the device 100 can comprise any suitable display, such as noted earlier, a touch screen display or graphical user interface. In one embodiment, the display 114 can be integral to the device 100. In alternate embodiments the display may be a peripheral display connected or coupled to the device 100. A pointing device, such as for example, a stylus, pen or simply the user's finger may be used with the display 114. In alternate embodiments any suitable pointing device may be used. In other alternate embodiments, the display may be any suitable display, such as for example a flat display 114 that is typically made of an LCD with optional back lighting, such as a TFT matrix capable of displaying color images. A touch screen may be used instead of a conventional LCD display.

The device 100 may also include other suitable features such as, for example, a camera, loudspeaker, connectivity port or tactile feedback features.

Figure 5:
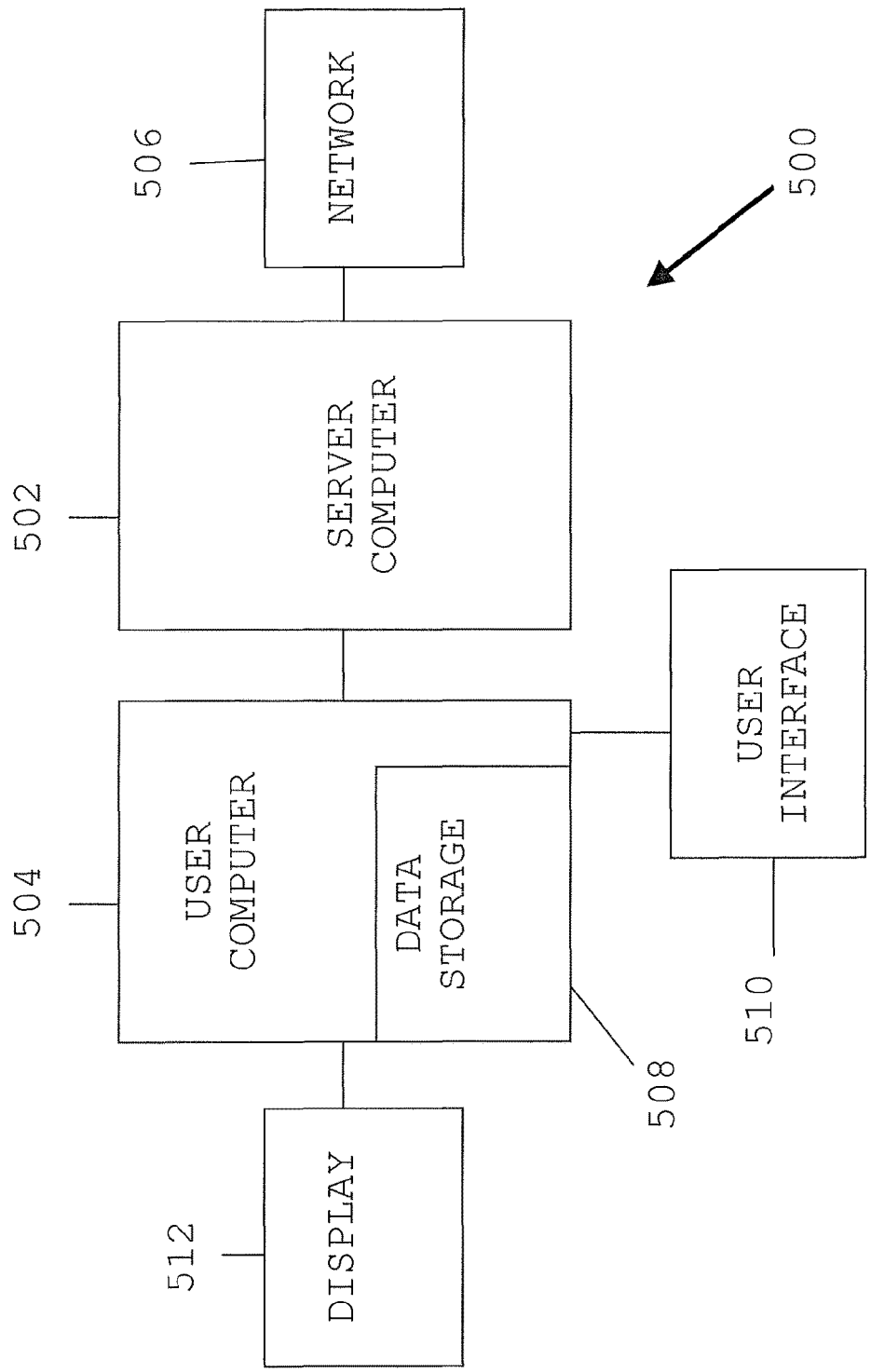
FIG. 5 illustrates a block diagram of an exemplary apparatus incorporating features that may be used to practice aspects of the disclosed embodiments.

The disclosed embodiments may also include software and computer programs incorporating the process steps and instructions described above that are executed in different computers. FIG. 5 is a block diagram of one embodiment of a typical apparatus 500 incorporating features that may be used to practice aspects of the invention. The apparatus 500 can include computer readable program code means for carrying out and executing the process steps described herein. As shown, a computer system 502 may be linked to another computer system 504, such that the computers 502 and 504 are capable of sending information to each other and receiving information from each other. In one embodiment, computer system 502 could include a server computer adapted to communicate with a network 506. Computer systems 502 and 504 can be linked together in any conventional manner including, for example, a modem, wireless, hard wire connection, or fiber optic link. Generally, information can be made available to both computer systems 502 and 504 using a communication protocol typically sent over a communication channel or through a dial-up connection on ISDN line. Computers 502 and 504 are generally adapted to utilize program storage devices embodying machine-readable program source code, which is adapted to cause the computers 502 and 504 to perform the method steps, disclosed herein. The program storage devices incorporating aspects of the invention may be devised, made and used as a component of a machine utilizing optics, magnetic properties and/or electronics to perform the procedures and methods disclosed herein. In alternate embodiments, the program storage devices may include magnetic media such as a diskette or computer hard drive, which is readable and executable by a computer. In other alternate embodiments, the program storage devices could include optical disks, read-only-memory ("ROM") floppy disks and semiconductor materials and chips.

Computer systems 502 and 504 may also include a microprocessor for executing stored programs. Computer 502 may include a data storage device 508 on its program storage device for the storage of information and data. The computer program or software incorporating the processes and method steps incorporating aspects of the invention may be stored in one or more computers 502 and 504 on an otherwise conventional program storage device. In one embodiment, computers 502 and 504 may include a user interface 510, and a display interface 512 from which aspects of the invention can be accessed. The user interface 510 and the display interface 512 can be adapted to allow the input of queries and commands to the system, as well as present the results of the commands and queries.

The disclosed embodiments generally provide for a user to be able to easily identify and view entities in various levels of detail without the need to open the communication application or communication channel. The presence of the entity is presented together with the level of associated activity and communication channels, both active and inactive. This supports quick channel selection for initiating communication as well as monitoring and basic presence.

It should be understood that the foregoing description is only illustrative of the embodiments. Various alternatives and modifications can be devised by those skilled in the art without departing from the embodiments. Accordingly, the disclosed embodiments are intended to embrace all such alternatives, modifications and variances that fall within the scope of the appended claims.

What is claimed is:

1. A method comprising:
providing at least one entity icon on a screen of a device, wherein each entity icon is associated with a respective contact entity, wherein each of the at least one entity icons is associated with a plurality of communication channels, each communication channel associated with the respective contact entity and a visual indicator, wherein at least one of the communication channels is associated with a third party hosting service for sharing information with other entities by the respective contact entity;
providing, for each entity icon, presence data of the respective contact entity;
providing, in response to selection of a particular entity icon, at least one visual indicator corresponding to an active communication channel and at least one visual indicator corresponding to an inactive communication channel, each visual indicator indicating activity of the respective associated contact entity using the communication channel, and wherein at least one of the visual indicators indicates a level of activity by having a varied appearance according to the level of activity on a respective associated third party hosting service, wherein the visual indicators for active communication channels and inactive communication channels are provided for display simultaneously and distinct from one another, and each visual indicator of an entity icon has a communication channel that is different from a communication channel of other ones of the visual indicators of that entity icon; and
opening a communication link associated with the selected entity icon in response to receiving a selection of a visual indicator associated with the selected entity icon corresponding to an active communication channel.

2. The method of claim 1 wherein providing an indication of the level of activity associated with the contact entity of the entity icon comprises varying at least one attribute of the at least one entity icon on the display of the device, the at least one attribute being varied to correspond to a non-binary level of activity associated with each contact entity.

3. The method of claim 2 further comprising varying a rotational speed of each of the at least one entity icon on the display in dependence on the level of activity associated with a respective communication application.

4. The method of claim 1, further comprising, after opening a communication application expanding each communication mode to provide more detail on the communication channel.

5. The method of claim 4 further comprising active communication channel extending from an upper area of the entity icon.

6. The method of claim 1 further comprising selecting a visual indicator in order to open an active communication channel.

7. The method of claim 6 further comprising, after the visual indicator is selected, displaying recent activity in the opened communication mode and dimming other communication channels to a background of the display.

8. The method of claim 1 further comprising providing an entity identifier adjacent to a corresponding entity icon, the entity identifier configured to remain in a horizontal orientation relative to a display orientation.

9. The method of claim 8 further comprising holding the entity identifier in a fixed horizontal orientation relative to the display orientation, the entity identifier configured to move with a respective entity icon about the display.

10. A user interface comprising:
a memory; and
a controller configured, responsive to execution of instructions stored by the memory, to:

present at least one entity icon, wherein each entity icon is associated with a respective contact entity, wherein each of the at least one entity icons is associated with a plurality of communication channels, each communication channel associated with the respective contact entity and a visual indicator, wherein at least one of the communication channels is associated with a third party hosting service for sharing information with other entities by the respective contact entity, present, for each entity icon, presence data of the respective contact entity, in response to selection of a particular entity icon, present simultaneously at least two visual indicators associated with the at least one entity icon, at least one of the at least two visual indicators corresponding to an active communication channel associated with the at least one entity icon, and at least one of the at least two visual indicators corresponding to an inactive communication channel associated with the at least one entity icon, each visual indicator indicating activity of the respective associated contact entity using the communication channel, and wherein at least one of the visual indicators indicates a level of activity by having a varied appearance according to the level of activity on a respective associated third party hosting service, wherein a visual indicator for an active communication channel is different than a visual indicator for an inactive communication channel and each visual indicator of an entity icon has a communication channel that is different from a communication channel of other ones of the visual indicators of that entity icon, and present a selection link associated with each visual indicator, the activation of which will couple a contact entity associated with a respective entity icon to the respective communication channel.

11. The user interface of claim 10 where the controller is further configured to present a selectable link associated with the at least one entity icon, a selection of which will provide detailed information related to the contact entity and each associated communication channel.

12. An apparatus comprising:
a processor; and
a memory including computer program code, the memory and the computer program code configured to, with the processor, cause the apparatus at least to:
provide at least one entity icon on a screen of a device, wherein each entity icon is associated with a respective contact entity, wherein each of the at least one entity icons is associated with a plurality of communication channels, each communication channel is associated with the respective contact entity and a visual indicator, wherein at least one of the communication channels is associated with a third party hosting service for sharing information with other entities by the respective contact entity;
provide, for each entity icon, presence data of the respective contact entity;
provide, in response to selection of a particular entity icon, at least one visual indicator corresponding to an active communication channel and at least one visual indicator corresponding to an inactive communication channel, each visual indicator indicating activity of the respective associated contact entity using the communication channel, and wherein at least one of the visual indicators indicates a level of activity by having a varied appearance according to the level of activity on a respective associated third party hosting service, wherein the visual indicators for active communication channels and inactive communication channels are provided for display simultaneously and distinct from one another, and each of the visual indicators of an entity icon corresponds to a mode of communication that is different from a channel of communication of other ones of the visual indicators of that entity icon; and open a communication link to a contact entity associated with the selected entity icon over a communication channel in response to receiving selection of a visual indicator corresponding to an active communication channel.

13. A computer program product stored in a memory comprising:
a non-transitory computer useable medium having computer readable code embodied therein for causing a computer to open a communication mode with a contact entity, the computer readable code in the computer program product comprising:
computer readable program code for causing a computer to provide at least one entity icon on a display of a device, wherein each entity icon is associated with a respective contact entity, wherein each of the at least one entity icons is associated with a plurality of communication channels, each communication channel is associated with the respective contact entity and a visual indicator, wherein at least one of the communication channels is associated with a third party hosting service for sharing information with other entities by the respective contact entity;
computer readable program code for causing a computer to provide, for each entity icon, presence data of the respective contact entity;
computer readable program code for, in response to selection of a particular entity icon, causing a computer to provide at least two visual indicators for display simultaneously corresponding to at least one communication channel associated with the entity icon, wherein at least one of the at least two visual indicators corresponds to an active communication channel and at least one of the at least two visual indicators corresponds to an inactive communication channel;
computer readable program code for causing a computer to apply different visual indicators to active communication channels and inactive communication channels, each visual indicator indicating activity of the respective associated contact entity using the communication channel, and wherein at least one of the visual indicators indicates a level of activity by having a varied appearance according to the level of activity on a respective associated third party hosting service, wherein each of the visual indicators of an entity icon corresponds to a communication channel that is different from a communication channel of other ones of the visual indicators of that entity icon; and
computer readable program code for causing a computer to open a communication channel to a contact entity associated with the entity icon in response to receiving selection of a visual indicator corresponding to an active communication.

14. The method of claim 1, wherein the communication channels correspond to at least one of an email application channel, a voice-over-internet-protocol application channel, or a social media application channel.

15. The method of claim 14, wherein the visual indicator for an active communication channel comprises an icon representative of the corresponding application.

16. The method of claim 1, wherein each visual indicator is unique to the communication channel it represents.

17. The method of claim 1, wherein each visual indicator has a unique communication channel that is different than all of the other ones of the communication channels.

18. The method of claim 1, wherein the indication of the level of activity is a speed on the display at which each entity icon moves.

\* \* \* \* \*